United States Patent
Guo

(10) Patent No.: US 12,014,035 B2
(45) Date of Patent: Jun. 18, 2024

(54) DISPLAY METHOD AND APPARATUS FOR MESSAGE DETAIL PAGE, AND ELECTRONIC DEVICE

(71) Applicant: VIVO MOBILE COMMUNICATION CO., LTD., Dongguan (CN)

(72) Inventor: Yangmin Guo, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/990,058

(22) Filed: Nov. 18, 2022

(65) Prior Publication Data

US 2023/0152952 A1 May 18, 2023

Related U.S. Application Data

(63) Continuation of application No. PCT/CN2021/094330, filed on May 18, 2021.

(30) Foreign Application Priority Data

May 20, 2020 (CN) .......................... 202010432002.3

(51) Int. Cl.
*G06F 3/04842* (2022.01)
*H04L 51/224* (2022.01)

(52) U.S. Cl.
CPC ........ *G06F 3/04842* (2013.01); *H04L 51/224* (2022.05)

(58) Field of Classification Search
CPC ............................ G06F 3/04842; H04L 51/224
See application file for complete search history.

(56) References Cited

U.S. PATENT DOCUMENTS

| | | | |
|---|---|---|---|
| 9,973,721 B2 | 5/2018 | Wang et al. | |
| 2011/0191694 A1* | 8/2011 | Coleman | H04L 51/216 |
| | | | 715/752 |
| 2015/0312181 A1 | 10/2015 | Peterson et al. | |
| 2017/0206863 A1* | 7/2017 | An | G06F 3/0338 |
| 2017/0336926 A1* | 11/2017 | Chaudhri | H04L 51/18 |

FOREIGN PATENT DOCUMENTS

| | | |
|---|---|---|
| CN | 103699405 A | 4/2014 |
| CN | 104994439 A | 10/2015 |
| CN | 106293304 A | 1/2017 |
| CN | 106598430 A | 4/2017 |
| CN | 106681591 A | 5/2017 |
| CN | 107844355 A | 3/2018 |
| CN | 111638841 A | 9/2020 |

* cited by examiner

*Primary Examiner* — Normin Abedin
(74) *Attorney, Agent, or Firm* — The Webb Law Firm

(57) ABSTRACT

A display method includes: receiving a first input on a target display region of an electronic device, where the target display region is used to display a message, and the message includes a push message or a notification message; and in a case that the message displayed in the target display region is updated within preset duration before the first input is received, displaying a first detail page corresponding to a before-update message in response to the first input, where the first detail page corresponding to the before-update message is different from a second detail page corresponding to an after-update message.

17 Claims, 10 Drawing Sheets

DISPLAY METHOD AND APPARATUS FOR MESSAGE DETAIL PAGE, AND ELECTRONIC DEVICE

CROSS REFERENCE TO RELATED APPLICATIONS

This application is a Bypass Continuation Application of PCT/CN2021/094330 filed May 18, 2021, which claims priority to Chinese Patent Application No. 202010432002.3 filed May 20, 2020, the disclosures of which are hereby incorporated by reference in their entirety.

BACKGROUND OF THE INVENTION

Field of the Invention

Embodiments of this disclosure relate to the field of communication technologies, and in particular, to a display method and apparatus for a message detail page, and an electronic device.

DESCRIPTION OF RELATED ART With the development of electronic technologies, electronic devices having touch screens are increasingly popular. Generally, in a scenario where a user uses an electronic device having a touch screen, the user can trigger the electronic device to perform a corresponding function by touching content displayed in the touch screen of the electronic device.

SUMMARY OF THE INVENTION

Embodiments of this disclosure provide a display method and apparatus for a message detail page, and an electronic device.

According to a first aspect, an embodiment of this disclosure provides a display method for a message detail page. The method includes: receiving a first input on a target display region of an electronic device, where the target display region is used to display a message, and the message includes a push message or a notification message; and in a case that the message displayed in the target display region is updated within preset duration before the first input is received, displaying a first detail page corresponding to a before-update message in response to the first input, where the first detail page corresponding to the before-update message is different from a second detail page corresponding to an after-update message.

According to a second aspect, an embodiment of this disclosure provides a display apparatus for a message detail page. The apparatus includes a receiving module and a display module, where the receiving module may be configured to receive a first input on a target display region of an electronic device, where the target display region is used to display a message, and the message includes a push message or a notification message; and the display module may be configured to: in a case that the message displayed in the target display region is updated within preset duration before the receiving module receives the first input, display a first detail page corresponding to a before-update message in response to the first input, where the first detail page corresponding to the before-update message is different from a second detail page corresponding to an after-update message.

According to a third aspect, an embodiment of this disclosure provides an electronic device. The electronic device includes a processor, a memory, and a program or an instruction stored in the memory and executable on the processor, where when the program or the instruction is executed by the processor, steps of the method according to the first aspect are implemented.

According to a fourth aspect, an embodiment of this disclosure provides a non-transitory readable storage medium. The non-transitory readable storage medium stores a program or an instruction, where when the program or the instruction is executed by a processor, steps of the method according to the first aspect are implemented.

According to a fifth aspect, an embodiment of this disclosure provides a chip. The chip includes a processor and a communications interface, where the communications interface is coupled to the processor, and the processor is configured to execute a program or an instruction, to implement the method according to the first aspect.

DESCRIPTION OF THE INVENTION

Figure 1:
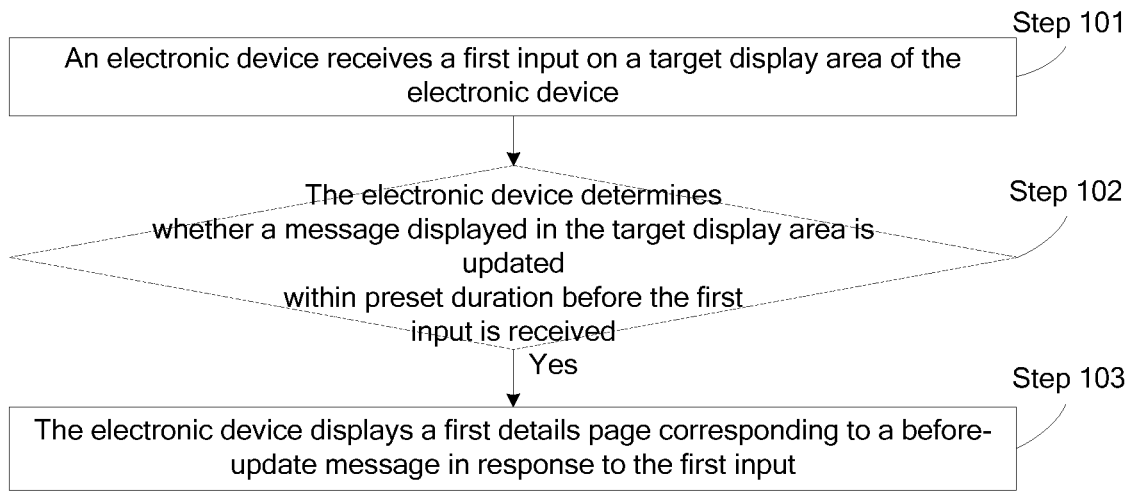
FIG. 1 is a first schematic diagram of a display method for a message detail page according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The terms "first", "second", and the like in this specification and claims of this disclosure are used to distinguish between similar objects instead of describing a specific order or sequence. It should be understood that the data used in this way is interchangeable in appropriate circumstances so that the embodiments of this disclosure can be implemented in other orders than the order illustrated or described herein. In addition, "and/or" in the specification and claims represents at least one of connected objects. Symbol "I" in this specification generally represents an "or" relationship between associated objects.

At present, posters can be displayed in turn on a desktop of an electronic device. In other words, the posters are displayed in a display region on the desktop of the electronic device, and the posters can be displayed in turn over time. In the process of displaying the posters on the desktop of the electronic device in turn, if the user finds a poster of interest, the user can trigger the electronic device to display a detail page corresponding to the poster by performing a touch operation on the display region. Therefore, the user can view details about the poster.

However, in the process of displaying the posters in turn, when the user finds the poster of interest, if the poster is updated within a short period of time before the user performs an input on the display region of the poster, the electronic device may display a detail page of an after-update poster after the user performs the input on the display region. As a result, content displayed by the electronic device is not content required by the user, that is, the content-displaying intelligence level of the electronic device is low.

With reference to the accompanying drawings, the following describes in detail the display method for a message detail page in the embodiments of this disclosure based on some embodiments and application scenarios thereof.

In this embodiment of the present disclosure, an electronic device can display a notification message or a push message (hereinafter collectively referred to as "message") in a target display region (for example, a display region in a minus one screen of the electronic device) in a screen of the electronic device. If a user needs to view the message displayed in the target display region (for example, the user has an interest in the message), the user can view, by performing an input on the target display region, a detail page corresponding to the message displayed in the target display region. Generally, messages displayed in the target display region may change continuously. In other words, the messages may be displayed in the target display region in turn, and each message may stay in the target display region for certain duration. When the user needs to view a message (hereinafter referred to as "first message") currently displayed in the target display region, the user may perform a click input on the target display region. At this moment, the duration of stay of the first message may have been ended, that is, a message displayed in the target display region may have been updated from the first message to a second message. In other words, because there is a time difference between a moment when the user determines his/her demand of viewing a message displayed in the target display region to a moment when the user performs a click input on the target display region, if the message displayed in the target display region is updated within the time difference, the user may perform the operation on an after-update message in the target display region. In this case, the electronic device can determine, by detecting whether content in the target display region is updated within preset duration before the first input is received, whether an operation triggered by the user for an after-update message is an accidentally triggered operation. Therefore, when the electronic device determines that the content in the target display region is updated within the time difference, the electronic device can directly display, for the user, a detail page corresponding to the first message before the update. In this way, the following problems can be avoided: the electronic device displays, for the user, a detail page that corresponds to the second message and that is not required by the user; and after the detail page corresponding to the second message is displayed, the user further needs to perform a series of operations to trigger the electronic device to display the detail page corresponding to the first message. Therefore, the content-displaying intelligence level of an electronic device is increased; and usage experience of a user is improved.

For example, in a scenario in which the target display region displays a notification message, for example, a notification message of a weather forecast, if the user needs to view the notification message of a weather forecast, but the message displayed in the target display region is updated to an SMS notification message when the user performs a click input on the target display region, the electronic device can determine, after receiving the first input performed by the user, whether content in the target display region is updated within the preset duration before the first input is received. If the electronic device determines that the notification message of a weather forecast displayed in the target display region is updated to the SMS notification message within the preset duration before the first input is received, the electronic device can determine that an operation triggered by the user for the SMS notification message is an accidentally triggered operation, that is, the electronic device can determine that the user may actually need to view a weather forecast detail page corresponding to the notification message of a weather forecast, so that the electronic device can directly display the weather forecast detail page corresponding to the notification message of a weather forecast.

For another example, in another scenario in which the target display region displays a push message, for example, a shopping push message, if the user needs to view the shopping push message, but the message displayed in the target display region is updated to a news push message when the user performs a click input on the target display region, the electronic device can determine, after receiving the first input performed by the user, whether content in the target display region is updated within the preset duration before the first input is received. If the electronic device determines that the shopping push message displayed in the target display region is updated to the news push message within the preset duration before the first input is received, the electronic device can determine that an operation triggered by the user for the news push message is an accidentally triggered operation, that is, the electronic device can determine that the user may actually need to view a shopping detail page corresponding to the shopping push message, so that the electronic device can directly display the shopping detail page corresponding to the shopping push message.

As shown in FIG. 1, an embodiment of this disclosure provides a display method for a message detail page. The method may include the following step 101 to step 103.

Step 101: an electronic device receives a first input on a target display region of the electronic device.

The target display region is used to display a message, and the message includes a push message or a notification message.

Optionally, in this embodiment of this disclosure, the target display region is a region that is in a screen of the electronic device and that is used to display a message, and the message in the display region can be updated. Optionally, the target display region may be a region that is in a minus one screen of the electronic device and that is used to display a message; or the target display region may be a region that is in a page of an application and that displays messages in turn; or the target display region may be a region that is in the screen of the electronic device and that updates a displayed message. Specifically, this may be determined according to an actual use requirement, and is not specifically limited in this embodiment of this disclosure.

It should be noted that, in this embodiment of this disclosure, the message displayed in the target display region may include a push message or a notification message. The push message may be any one of following: a push message of the electronic device, a push message of an application, a push message of an application plug-in (for example, news or information pushed by the application plug-in), or the like. The notification message may be any one of following: a call or an SMS notification of the electronic device, a system notification of the electronic device, a notification message of an application, or the like. In addition, the message displayed in the target display region may further include another message. Another message is a message that can be updated.

Optionally, in this embodiment of this disclosure, both the push message and the notification message displayed in the target display region may be displayed as view controls. For example, the target display region of the electronic device may display a view control. The view control displays posters in turn.

Optionally, in this embodiment of this disclosure, the electronic device in the above step 101 may be implemented in the following manner: first, the electronic device receives an input performed by a user, and obtains an input position of the input. Then, the electronic device determines whether the input performed by the user is an input on the target display region, that is, determines whether a position where the input performed by the user is received falls within the target display region. If the input performed by the user is an input (for example, the first input) on the target display region, the electronic device determines to receive the input on the target display region, and perform a subsequent step; or if the input performed by the user is not an input on the target display region, the electronic device executes a function corresponding to a region where the input is performed, instead of performing a subsequent step of this disclosure.

Optionally, in this embodiment of this disclosure, obtaining the position of the input performed by the user and obtaining a position of the target display region can be implemented by obtaining a pixel position or a coordinate position in the screen of the electronic device. In other words, the position of the input performed by the user can be represented by the pixel position or the coordinate position of the input performed by the user in the screen of the electronic device; and the position of the target display region can be represented by a plurality of coordinate positions, for example, positions of coordinate points on edges of the target display region.

Step 102: the electronic device determines whether a message displayed in the target display region is updated within preset duration before the first input is received.

If the message displayed in the target display region is updated within the preset duration before the first input is received, the following step 103 is performed; or if the message displayed in the target display region is not updated within the preset duration before the first input is received, the following step 104 is performed.

It should be noted that, in this embodiment of this disclosure, the preset duration is relatively short duration, and is a period from a moment when the message displayed in the display region is updated to a moment when the user notices the update and changes an input action according to the update. In other words, when the user performs an input on the message displayed in the target display region, the message in the display region is updated. In this case, the user cannot react in time and still performs an input on the message in the display region. As a result, an accidental touch operation is performed on the after-update message. Generally, the preset duration is preferably not greater than 2 seconds. Specifically, this may be determined according to an actual use requirement. Typically, because human response time is about 0.2 second, the preset duration is not less than 0.2 second. It should be noted that, for ease of description, the following embodiments of this disclosure are illustratively described by using an example in which the preset duration is 2 seconds.

Optionally, in this embodiment of this disclosure, an updating manner of the message displayed in the target display region may be any one of following manners. Manner 1: in a case that the target display region is a region that is in the screen of the electronic device and that displays a notification message, the electronic device updates the message displayed in the target display region once every time it receives a new message. For example, assuming that the target display region is a top region that the electronic device displays a notification message, this region generally displays a notification message that is received recently. If the target display region displays an SMS notification at one moment, and the electronic device receives an email notification message at a next moment, the electronic device may display the email notification message in the region, that is, the notification message displayed in the target display region is updated. Manner 2: in a case that the target display region is a region that is in a page of an application and that displays posters in turn, the electronic device may display the posters in turn on time based on preset update time of the posters, that is, notification messages (namely, the posters) in the target display region are sequentially updated and displayed based on preset time. For example, assuming that a poster in a target display region in a target screen of an application is updated once every 5 seconds, if a moment when the user enters the application is 12:00:05 (namely, 5 seconds past 12 o'clock), and the target display region displays a poster A at this moment, the target display region starts to display a poster B next to the poster A at 12:00:10 (namely, 10 seconds past 12 o'clock), and starts to display a poster C next to the poster B at 12:00:15 (namely, 15 seconds past 12 o'clock). Specifically, this may be determined according to an actual use requirement, and is not specifically limited in this embodiment of this disclosure.

Optionally, in this embodiment of this disclosure, the above step 102 may be implemented in the following two determining manners, to determine whether the message displayed in the target display region is updated within the preset duration before the first input is received.

Determining Manner 1

Figure 2:
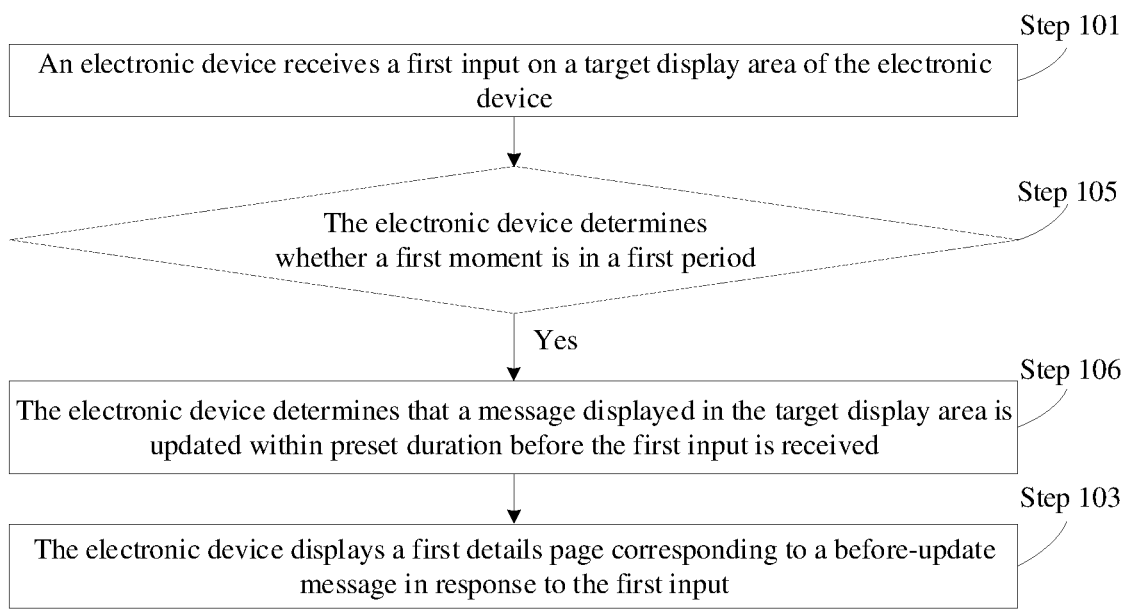
FIG. 2 is a second schematic diagram of a display method for a message detail page according to an embodiment of this disclosure.

With reference to FIG. 1, as shown in FIG. 2, after the above step 101, the display method for a message detail page provided in this embodiment of this disclosure may further include the following step 105 and step 106, that is, the above step 102 can be replaced with the following step 105 and step 106.

Step 105: the electronic device determines whether a first moment is in a first period.

If the first moment is in the first period, perform the following step 106; or if the first moment is not in the first period, perform the following step 108.

The first moment is a moment when a last message update is performed in the target display region; the first period is a period from a second moment to a third moment; the second moment is a moment when the first input is received; and the third moment is a moment that is the preset duration earlier than the second moment.

It should be noted that, the moment when the last message update is performed in the target display region is a moment when a push message or notification message update is performed in the target display region for the last time. The third moment is a moment that is the preset duration earlier than the moment when the electronic device receives the first input (namely, the second moment). For example, assuming that the preset duration is 2 seconds, if a moment when the electronic device receives the first input is 12:00:02 (namely, 2 seconds past 12 o'clock), the third moment is 12:00:00 (namely, a moment that is 2 seconds earlier than 2 seconds past 12 o'clock).

Figure 3:
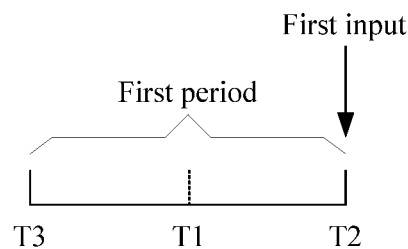
FIG. 3 is a first schematic diagram of a temporal relationship according to an embodiment of this disclosure.

Optionally, as shown in FIG. 3, a moment T2 (namely, the second moment) is the moment when the first input is received; a moment T3 (namely, the third moment) is a moment that is the preset duration earlier than the moment T2; a time difference between T2 and T3 is the preset duration; and a period between T2 and T3 is the first period. If the moment (namely, the first moment) when the last message update is performed in the target display region is in the period between T2 and T3, the electronic device determines that the message displayed in the target display region is updated within the preset duration (namely, the first period) before the first input is received. If the moment (namely, the first moment) when the last message update is performed in the target display region is not in the period between T2 and T3, the electronic device determines that the message displayed in the target display region is not updated within the preset duration before the first input is received.

Optionally, the electronic device may obtain the moment (namely, the second moment) when the first input is received and determine the third moment based on a relationship between the second moment and the third moment.

Optionally, in this embodiment of this disclosure, before performing the above step 105, the electronic device may obtain duration of stay of the message displayed in the target display region, to obtain the first moment. The duration of stay of the message may be obtained in any one of following manners: Manner 1: the electronic device may record the duration of stay of the message in the target display region. Manner 2: the electronic device sends a request message to a server, and the server receives the request message and sends update time information of the message in the target display region to the electronic device, so that the electronic device determines the duration of stay of the message in the target display region based on the update time information and system time of the electronic device.

Step 106: the electronic device determines that a message displayed in the target display region is updated within preset duration before the first input is received.

For example, assuming that the preset duration is 2 seconds, if the moment when the electronic device receives the first input is 12:00:02, that is, the moment T2 is 12:00:02 (2 seconds past 12 o'clock), the moment T3 is 12:00:00 (namely, a moment that is the preset duration earlier than 2 seconds past 12 o'clock). If the moment T1 when the last message update is performed in the target display region of the electronic device is 12:00:01 (that is, the first moment is 1 second past 12 o'clock), that is, the moment T1 is the period between T2 and T3, the electronic device determines that the message displayed in the target display region is updated within the preset duration (namely, the period between T2 and T3) before the first input is received.

It may be understood that in this embodiment of this disclosure, the electronic device can detect whether the moment when the last message update is performed in the target display region is within a period between the moment when the first input is received and the moment that is the preset duration earlier than the moment when the first input is received. When the moment is in the period, the electronic device can determine that the message displayed in the target display region of the electronic device is updated within the preset duration before the first input is received. When the moment is not in the period, the message displayed in the target display region of the electronic device is not updated. In this way, the electronic device can determine whether the message displayed in the target display region of the electronic device is updated within the preset duration before the first input is received, so that a detail page required by the user can be displayed more accurately, thereby improving the content-displaying intelligence level of the electronic device.

Determining Manner 2

Figure 4:
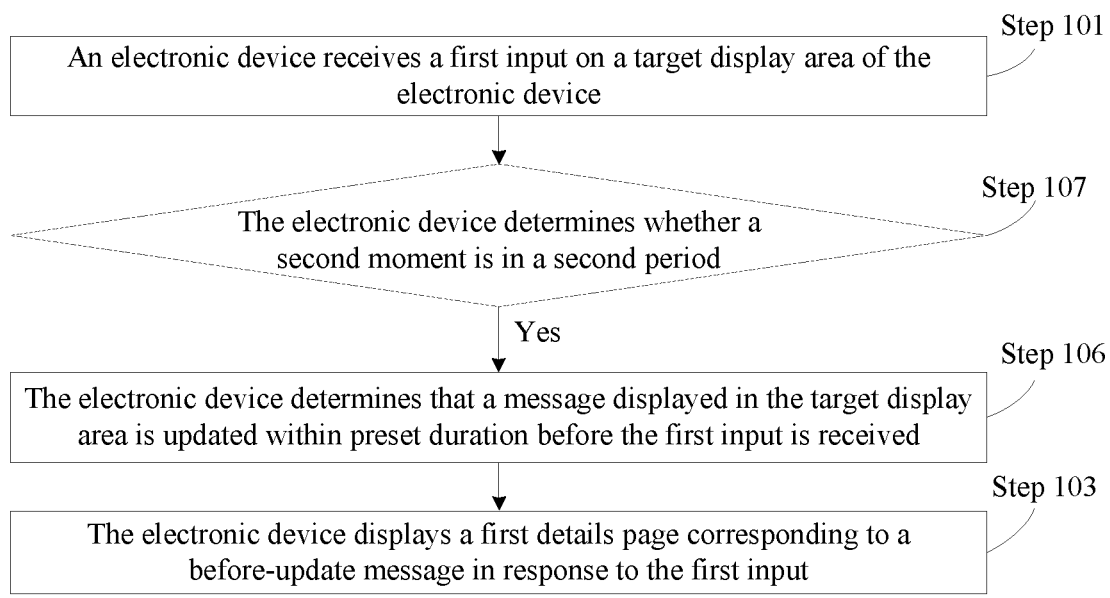
FIG. 4 is a third schematic diagram of a display method for a message detail page according to an embodiment of this disclosure.

With reference to FIG. 1, as shown in FIG. 4, after the above step 101, the display method for a message detail page provided in this embodiment of this disclosure may further include the following step 107, that is, the above step 102 can be replaced with step 107 and step 106.

Step 107: the electronic device determines whether a second moment is in a second period.

The second moment is a moment when the first input is received; the second period is a period from a first moment to a fourth moment; the first moment is a moment when a last message update is performed in the target display region; and the fourth moment is a moment that is the preset duration later than the first moment.

If the second moment is in the second period, perform the above step 106; or if the second moment is not in the second period, perform the following step 108.

It should be noted that, in this embodiment of this disclosure, the fourth moment is a moment that is the preset duration later than the moment (namely, the first moment) when the last message update is performed in the target display region. For example, assuming that the preset duration is 2 seconds, if the moment when the last message update is performed in the target display region is 12:00:01 (namely, 1 second past 12 o'clock), the fourth moment is 12:00:03 (namely, a moment that is the preset duration later than 1 second past 12 o'clock).

Figure 5:
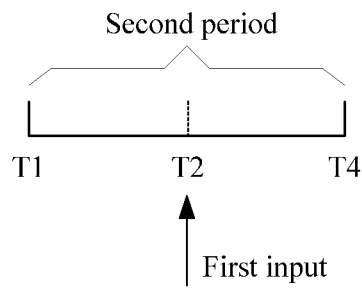
FIG. 5 is a second schematic diagram of a temporal relationship according to an embodiment of this disclosure.

Optionally, as shown in FIG. 5, a moment T1 (namely, the first moment) is the moment when the last message update is performed in the target display region; a moment T4 (namely, the fourth moment) is a moment that is the preset duration later than the moment T1; a time difference between T1 and T4 is the preset duration; and a period between T1 and T4 is the second period. If the moment (namely, the second moment) when the first input is received is in the period between T1 and T4, the electronic device determines that the message displayed in the target display region is updated within the preset duration before the first input is received. If the moment when the first input is received is not in the period between T1 and T4, the electronic device determines that the message displayed in the target display region is not updated within the preset duration before the first input is received.

It should be noted that, in this embodiment of this disclosure, before performing step 107, the electronic device obtains the moment (namely, the first moment) when the last message update is performed in the target display region. For a obtaining step, refer to related description in the above step 105. Details are not described again. The electronic device may further determine the fourth moment based on a relationship between the first moment and the fourth moment.

For example, assuming that the preset duration is 2 seconds, if the moment when the last message update is performed in the target display region of the electronic device is 12:00:03, that is, the moment T1 is 12:00:03 (3 seconds past 12 o'clock), the moment T4 is 12:00:05 (namely, a moment that is the preset duration later than 3 seconds past 12 o'clock). If the moment T2 (namely, the second moment) when the electronic device receives the first input is 12:00:04, that is, the moment T2 is the period (namely, the second period) between T1 and T4, the electronic device determines that the message displayed in the target display region is updated within the preset duration before the first input is received.

It may be understood that in this embodiment of this disclosure, the electronic device can detect whether the moment when the first input is received is within a period between the moment when the last message update is performed in the target display region and the moment that is the preset duration later than the moment when the last message update is performed. When the moment is in the period, the electronic device can determine that the message displayed in the target display region of the electronic device is updated within the preset duration before the first input is received. When the moment is not in the period, the message displayed in the target display region of the electronic device is not updated. In this way, the electronic device can determine whether the message displayed in the target display region of the electronic device is updated within the preset duration before the first input is received, so that a detail page required by the user can be displayed more accurately, thereby improving the content-displaying intelligence level of the electronic device.

Step 103: the electronic device displays a first detail page corresponding to a before-update message in response to the first input.

The first detail page corresponding to the before-update message is different from a second detail page corresponding to an after-update message.

It should be noted that, in this embodiment of this disclosure, the before-update message may be the same as or different from the after-update message. However, the first detail page corresponding to the before-update message is different from the second detail page corresponding to the after-update message.

Optionally, in this embodiment of this disclosure, each of the first detail page and the second detail page is a detail page corresponding to a message or indicated by a message. Optionally, the detail page may be any one of following: a detail page of an application corresponding to the message, a function screen of the application corresponding to the message, a detail page of a web page indicated by the message, detail content indicated by the message, and the like. Specifically, this may be determined according to an actual use requirement, and is not specifically limited in this embodiment of this disclosure.

Step 104: the electronic device displays a current detail page in response to the first input.

It should be noted that, in this embodiment of this disclosure, if the message displayed in the target display region is not updated within the preset duration before the first input is received, the electronic device displays the current detail page. The current detail page may be a second detail page, or may be another detail page, and depends on a screen currently displayed by the electronic device. This is not specifically limited in this embodiment of this disclosure, and may be determined according to an actual use requirement.

Figure 6A:
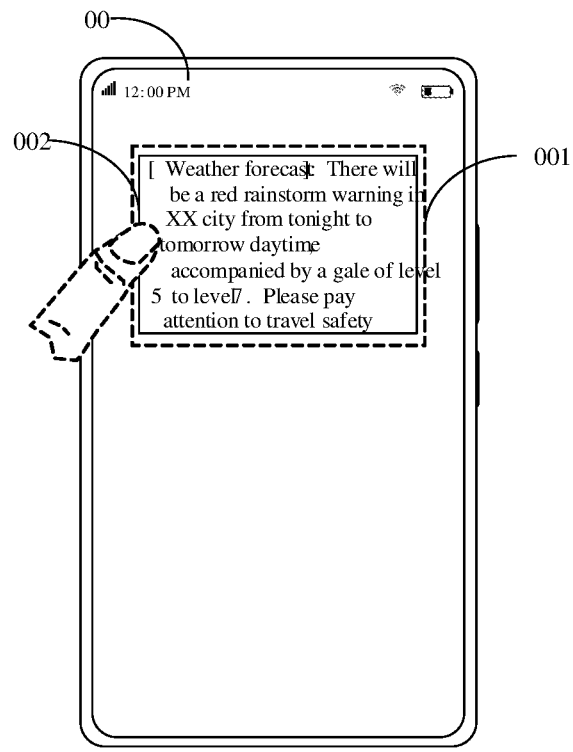
FIG. 6A is a first schematic diagram of an operation of displaying a message detail page by an electronic device according to an embodiment of this disclosure.
Figure 6B:
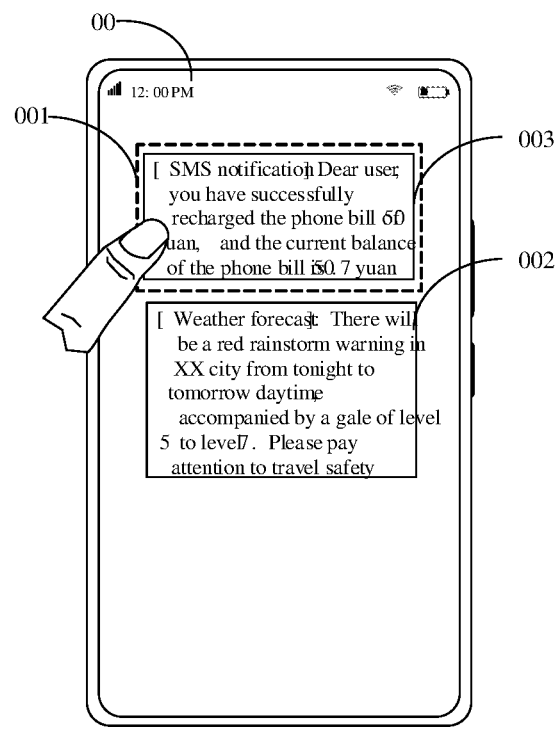
FIG. 6B is a second schematic diagram of an operation of displaying a message detail page by an electronic device according to an embodiment of this disclosure.
Figure 6C:
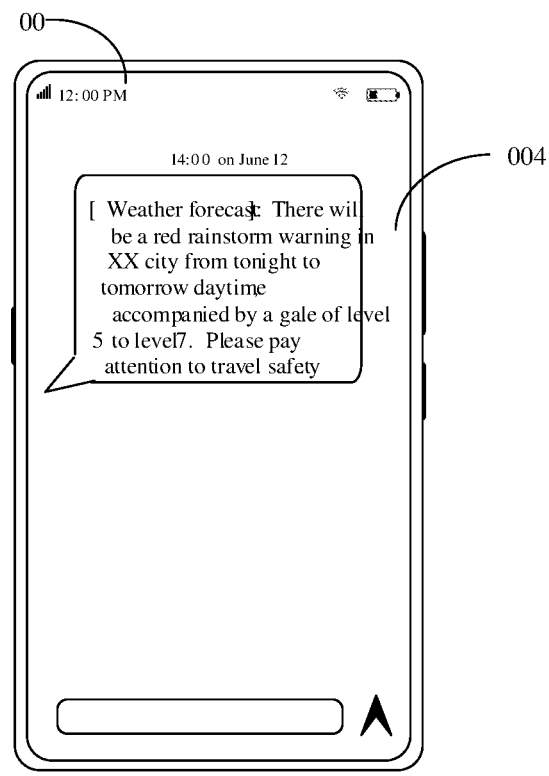
FIG. 6C is a third schematic diagram of an operation of displaying a message detail page by an electronic device according to an embodiment of this disclosure.

For example, FIG. 6A to FIG. 6C are some schematic diagrams of an operation of displaying a first detail page by an electronic device. As shown in FIG. 6A, a push message 002 of a weather forecast is displayed in a top region 001 (namely, the target display region) of a desktop of an electronic device 00. If the user is interested in the push message 002 of the weather forecast, the user may click (that is, perform the first input) on the top region 001. As shown in FIG. 6B, when the user clicks on the top region, the electronic device 00 receives a new SMS push message 003, and the SMS push message 003 is displayed in the top region 001. In this case, the user actually performs an input on the SMS push message 003 that is currently displayed in the top region 001. The electronic device 00 determines that content displayed in the top region 001 is updated from the push message 002 to the push message 003 within the preset duration before the click input is received, that is, an operation performed by the user for the push message 003 is an accidentally triggered operation. As shown in FIG. 6C, the electronic device 00 displays a detail page 004 corresponding to the push message 002 of the weather forecast in response to the click input.

Figure 7A:
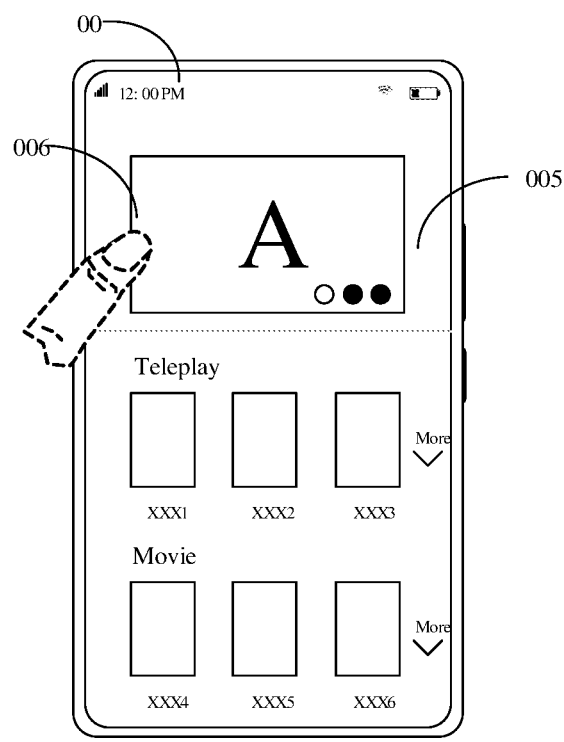
FIG. 7A is a fourth schematic diagram of an operation of displaying a message detail page by an electronic device according to an embodiment of disclosure.
Figure 7B:
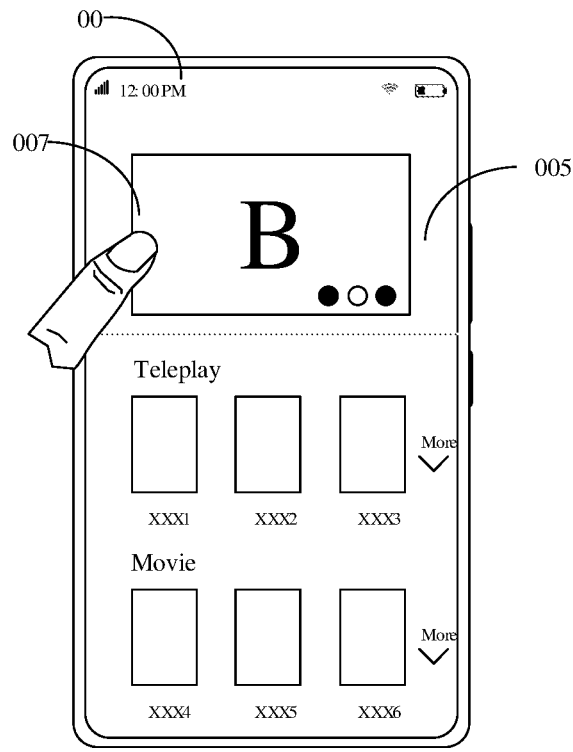
FIG. 7B is a fifth schematic diagram of an operation of displaying a message detail page by an electronic device according to an embodiment of disclosure.
Figure 7C:
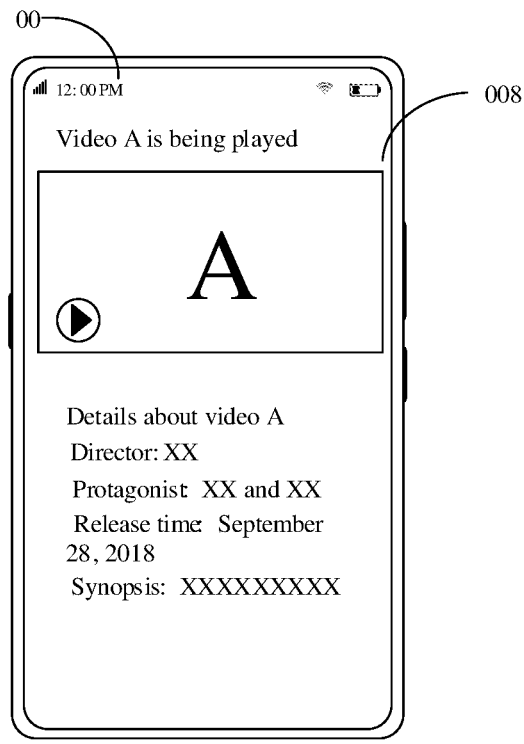
FIG. 7C is a sixth schematic diagram of an operation of displaying a message detail page by an electronic device according to an embodiment of disclosure.

For example, FIG. 7A to FIG. 7C are some schematic diagrams of an operation of displaying a first detail page by an electronic device. As shown in FIG. 7A, in a case that the electronic device 00 displays a screen of an application, a poster A and a poster B are displayed in a poster display region 005 of the screen of the application in turn, and the display region 005 currently displays the poster A. If the user is interested in a push message 006 of the poster A, the user may click (that is, perform the first input) on the region 005. As shown in FIG. 7B, in this case, the user actually performs an input on a push message 007 of the poster B displayed in the region. The electronic device 00 determines that content displayed in the region 005 is updated from the push message 006 of the poster A to the push message 007 of the poster B within the preset duration before the click input is received, that is, an operation performed by the user for the push message 007 of the poster B is an accidentally triggered operation. As shown in FIG. 7C, the electronic device 00 displays a detail page 008 corresponding to the push message 006 of the poster A in response to the click input.

The display method for a message detail page in this embodiment of this disclosure has the following steps: receiving a first input on a target display region of the electronic device used for displaying a push message or a notification message; and in a case that the message displayed in the target display region is updated within the preset duration before the first input is received, displaying a first detail page corresponding to a before-update message in response to the first input, where the first detail page corresponding to the before-update message is different from a second detail page corresponding to an after-update message. According to this solution, if a user needs to view the push message or the notification message displayed in the target display region, the user may perform an input (namely, the first input) on the target display region. In this case, if the electronic device determines that content in the target display region is updated within the preset duration before the first input is received, the electronic device can determine that the user wants to view a detail page corresponding to the before-update message, that is, the electronic device can determine that an operation triggered by the user for the after-update message is an operation accidentally triggered by the user, so that the electronic device can directly display the first detail page corresponding to the before-update message for the user. In this way, the following problems can be avoided: the electronic device displays, for the user, the second detail page that corresponds to the after-update message and that is not required by the user; and after the second detail page is displayed, the user further needs to perform a series of operations to trigger the electronic device to display the first detail page. Therefore, the content-displaying intelligence level of an electronic device is increased; and usage experience of a user is improved.

Optionally, in this embodiment of this disclosure, after the above step 101, the display method for a message detail page provided in this embodiment of this disclosure further includes the following step 108 and step 109.

Step 108: the electronic device determines whether the message displayed in the target display region is updated within a third period.

If the message displayed in the target display region is updated within the third period, the following step 109 is performed; or in a case that the message displayed in the target display region is not updated within the third period, a current detail page is displayed.

The third period is a period from the first moment to the third moment; the first moment is the moment when the last message update is performed in the target display region; and the third moment is a moment that is the preset duration earlier than the moment when the first input is received.

It should be noted that, in this embodiment of this disclosure, after the electronic device determines that the message displayed in the target display region is not updated within the first period, the electronic device may further determine whether the message displayed in the target display region is updated within the third period. If the message is updated within the third period, the second detail page corresponding to the after-update message is displayed; or if the message is not updated within the third period, the current detail page is displayed. The current detail page may be a second detail page, or may be another detail page. This is not particularly limited in this embodiment of this disclosure.

Figure 8:
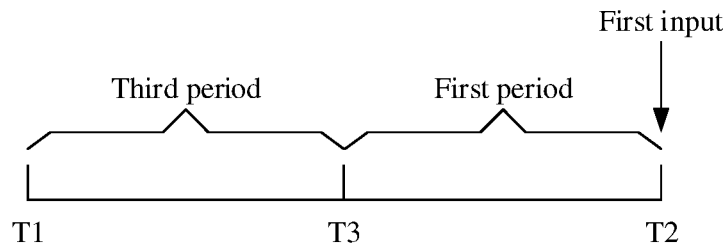
FIG. 8 is a third schematic diagram of a temporal relationship according to an embodiment of this disclosure.

Optionally, as shown in FIG. 8, a moment T2 (namely, the second moment) is the moment when the first input is received; a moment T3 (namely, the third moment) is a moment that is the preset duration earlier than the moment T2; and the moment T1 (namely, the first moment) is a moment when the last message update is performed in the target display region. The first period is a period between T3 and T2; and the third period is a period between T1 and T3. If the message displayed in the target display region is updated within the first period, step 106 is performed. For details, refer to related description in the above step 105 and step 106. If the message displayed in the target display region is not updated within the first period, whether the message displayed in the target display region is updated within the third period is further determined. If the message is updated within the third period, the second detail page corresponding to the after-update message is displayed (that is, the following step 109 is performed); or if the message is not updated within the third period, the current detail page is displayed.

Step 109: the electronic device displays a second detail page corresponding to an after-update message in response to the first input.

For example, assuming that the preset duration is 2 seconds, if the moment when the last message update is performed in the target display region of the electronic device is 12:00:03, that is, the moment T1 is 12:00:03 (3 seconds past 12 o'clock), a moment that is the preset duration earlier than the moment when the electronic device receives the first input is 12:00:01, that is, the moment T3 is 12:00:01 (1 second past 12 o'clock). If the moment when the message displayed in the target display region of the electronic device is updated is 12:00:02, that is, the moment is in the period between T1 and T3 (namely, the third period), the electronic device displays the second detail page corresponding to the after-update message.

It may be understood that in this embodiment of this disclosure, the electronic device may be further configured to: detect whether the message displayed in the target display region is updated within a third period; and in a case that the message displayed in the target display region is updated within the third period, display the second detail page corresponding to the after-update message. In this way, a detail page required by the user can be displayed more accurately, thereby improving the content-displaying intelligence level of the electronic device.

Figure 9:
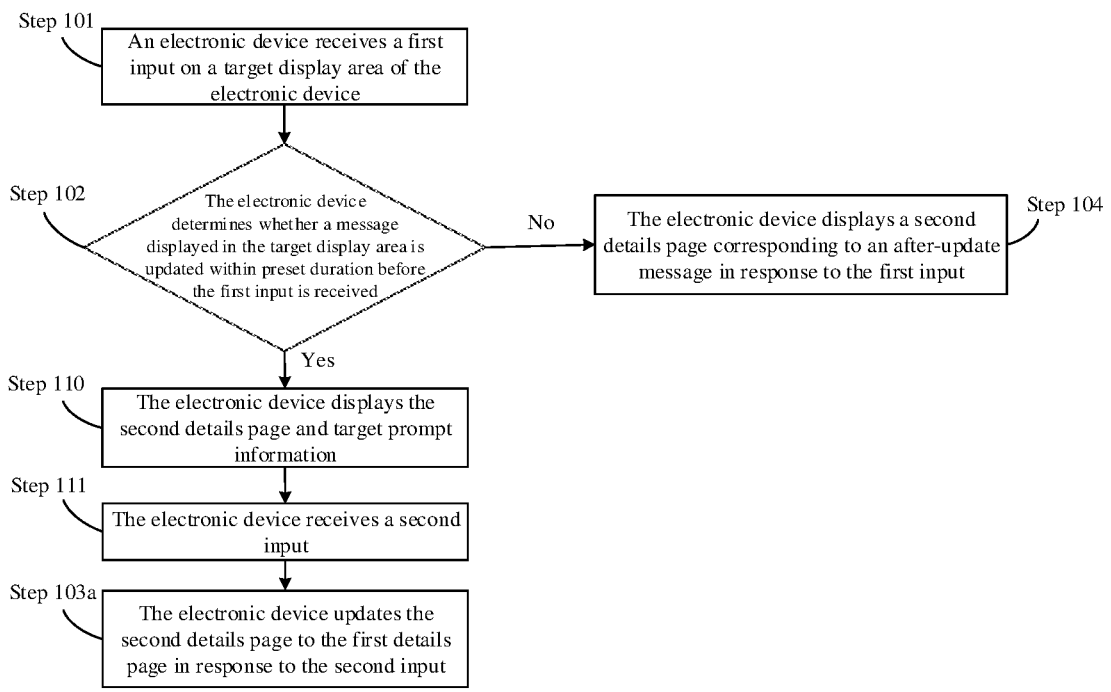
FIG. 9 is a fourth schematic diagram of a display method for a message detail page according to an embodiment of this disclosure.

Optionally, with reference to FIG. 1, as shown in FIG. 9, before the above step 103, the display method for a message detail page provided in this embodiment of this disclosure further includes the following step 110 and step 111. Correspondingly, step 103 may be implemented through the following step 103a.

Step 110: the electronic device displays the second detail page and target prompt information.

The target prompt information may be used to prompt the user that the first input is an accidentally triggered input.

It should be noted that, in this embodiment of this disclosure, the electronic device determines whether the message displayed in the target display region is updated within the preset duration before the first input is received. If the message is updated, the following step 110, step 111, and step 103a are performed, that is, the electronic device displays the second detail page and the target prompt information, and the electronic device is triggered, via the second input, to update the second detail page to the first detail page. If the message is not updated, step 104 is performed, that is, the current detail page is displayed.

Optionally, in this embodiment of this disclosure, the target prompt information may be at least one of following: ringing of the electronic device, a voice prompt, vibration of the electronic device, flashing of an indicator of the electronic device in a preset manner, displaying of prompt information by the electronic device, or the like. Optionally, each of the ringing of the electronic device, the voice prompt, the vibration, and the flashing of the indicator may be used to indicate that the first input is an accidentally triggered input. The prompt information displayed by the electronic device may be used to indicate that the first input is an accidentally triggered input. Optionally, the prompt information may be used to determine whether the user is interested in the before-update message, and the like. Specifically, this may be determined according to an actual use requirement, and is not specifically limited in this embodiment of this disclosure.

It should be noted that, in this embodiment of this disclosure, for a manner of determining whether the first input is an accidentally triggered input, refer to the above step 102. In other words, the manner is as follows: if the message displayed in the target display region is updated within the preset duration before the electronic device receives the first input, determine that the first input is an accidentally triggered input.

Step 111: the electronic device receives a second input.

Optionally, in this embodiment of this disclosure, the second input may be an input on a physical button of the electronic device, an input on the target prompt information, or an input on a region that is in a screen of the electronic device and that does not display the target prompt information. Specifically, this may be determined according to an actual use requirement, and is not specifically limited in this embodiment of this disclosure.

Optionally, the second input may be a press input on a target physical button of the electronic device; and the target physical button is used to determine the target prompt information. Alternatively, the second input may be a touch input for the target prompt information; and the touch input is used to determine the target prompt information. The touch input may be any one of following: a click input, a double-click input, a long-press input, a slide input on a preset track, or the like. Alternatively, the second input may be a touch input on a region that is in the screen of the electronic device and that does not display the target prompt information, to determine the target prompt information.

Step 103a: the electronic device updates the second detail page to the first detail page in response to the second input.

It should be noted that a manner in which the electronic device updates the second detail page to the first detail page is not specifically limited in this embodiment of this disclosure, and details can be determined according to an actual use requirement.

Figure 10A:
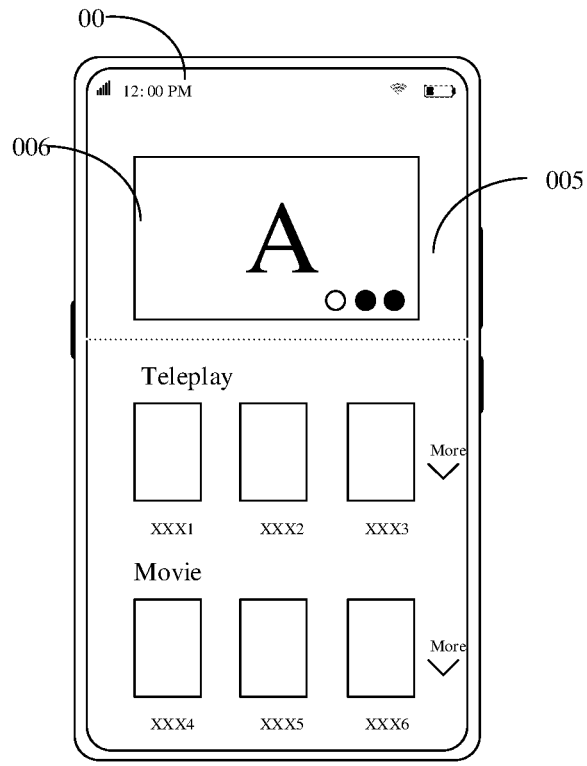
FIG. 10A is a seventh schematic diagram of an operation of displaying a message detail page by an electronic device according to an embodiment of this disclosure.
Figure 10B:
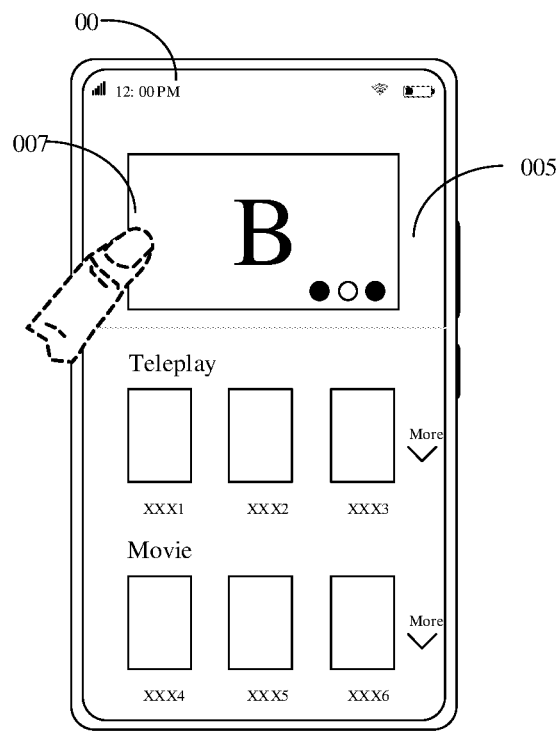
FIG. 10B is an eighth schematic diagram of an operation of displaying a message detail page by an electronic device according to an embodiment of this disclosure.
Figure 10C:
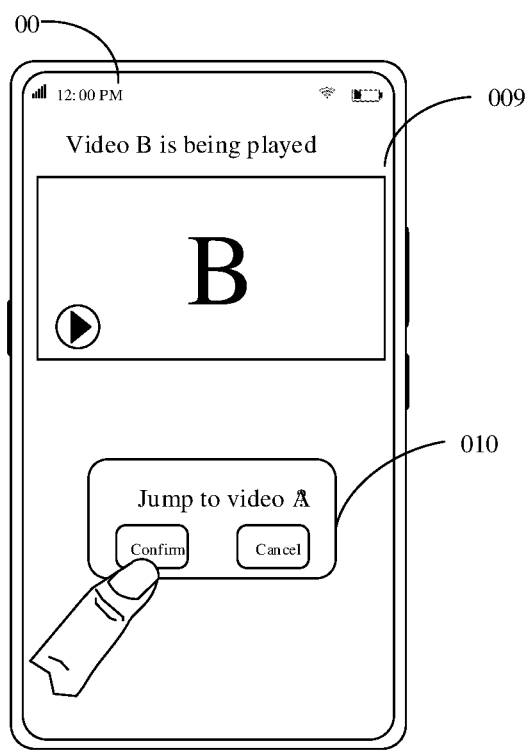
FIG. 10C is a ninth schematic diagram of an operation of displaying a message detail page by an electronic device according to an embodiment of this disclosure.
Figure 10D:
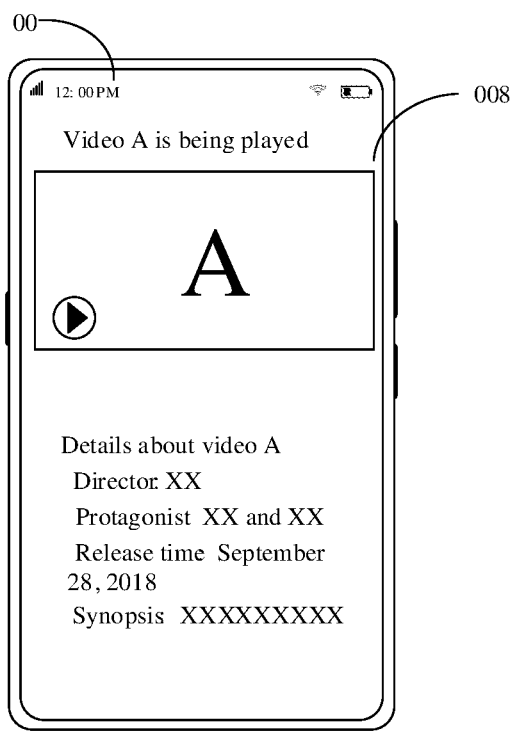
FIG. 10D is a tenth schematic diagram of an operation of displaying a message detail page by an electronic device according to an embodiment of this disclosure.

For example, FIG. 10A to FIG. 10D are some schematic diagrams of an operation of updating and displaying a first detail page by an electronic device. As shown in FIG. 10A, in a case that the electronic device 00 displays a screen of an application, a poster A and a poster B are displayed in a poster display region 005 of the screen of the application in turn, and the display region 005 currently displays the poster A. If the user is interested in a push message 006 of the poster A, the user may click on the region 005. As shown in FIG. 10B, in this case, the user actually performs an input on a push message 007 of the poster B displayed in the region. As shown in FIG. 10C, the electronic device 00 displays a detail page 009 (namely, the second detail page) corresponding to the push message 007 of the poster B and prompt information 010 (namely, the target prompt information) in response to the click input. The user may perform a long-press input on a "Confirm" control displayed in the prompt information 010; and the electronic device 00 may display the detail page 008 (namely, the first detail page) corresponding to the push message of the poster A in response to the long-press input, as shown in FIG. 10D.

It may be understood that in this embodiment of this disclosure, in a case that the electronic device displays the second detail page and the target prompt information, the user can trigger, via the second input, the electronic device to update the displayed second detail page to the first detail page. In this way, the following problem can be avoided: after the second detail page is displayed, the electronic device can be triggered to display the first detail page corresponding to the before-update message only when the user further returns to a previous message display screen and performs an input on the before-update message again in the screen. Therefore, the content-displaying intelligence level of an electronic device is increased, thereby further improving usage experience of a user.

It should be noted that, the display method for a message detail page provided in this embodiment of this disclosure may be performed by a display apparatus for a message detail page, or a control module that is in the display apparatus for a message detail page and that is used for performing the display method for a message detail page. In this embodiment of this disclosure, an example in which the display apparatus for a message detail page executes and loads the display method for a message detail page is used to describe the display method for a message detail page provided in the embodiments of this disclosure.

Figure 11:
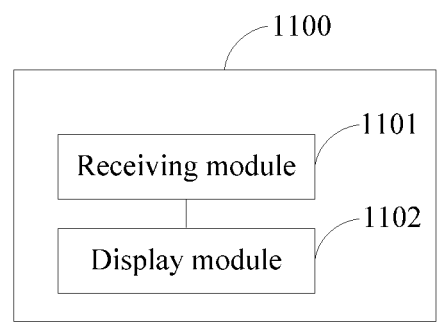
FIG. 11 is a first schematic structural diagram of an electronic device according to an embodiment of this disclosure.

As shown in FIG. 11, an embodiment of this disclosure provides a display apparatus 1100 for a message detail page. The display apparatus 1100 for a message detail page may include a receiving module 1101 and a display module 1102. The receiving module 1101 may be configured to receive a first input on a target display region of an electronic device, where the target display region is used to display a message, and the message includes a push message or a notification message. The display module 1102 may be configured to: in a case that the message displayed in the target display region is updated within preset duration before the receiving module 1101 receives the first input, display a first detail page corresponding to a before-update message in response to the first input. The first detail page corresponding to the before-update message is different from a second detail page corresponding to an after-update message.

Figure 12:
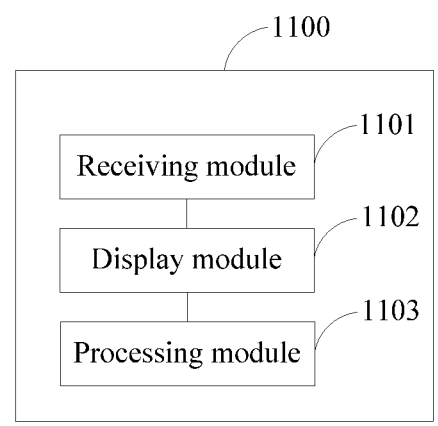
FIG. 12 is a second schematic structural diagram of an electronic device according to an embodiment of this disclosure.

With reference to FIG. 11, as shown in FIG. 12, in this embodiment of this disclosure, the display apparatus 1100 for a message detail page further includes a processing module 1103. The processing module 1103 may be configured to: in a case that a first moment is in a first period, determine that the message displayed in the target display region is updated within the preset duration before the first input is received. The first moment is a moment when a last message update is performed in the target display region; the first period is a period from a second moment to a third moment; the second moment is a moment when the first input is received; and the third moment is a moment that is the preset duration earlier than the second moment.

As shown in FIG. 12, in this embodiment of this disclosure, the display apparatus 1100 for a message detail page further includes a processing module 1103. The processing module 1103 may be configured to: in a case that a second moment is in a second period, determine that the message displayed in the target display region is updated within the preset duration before the first input is received. The second moment is a moment when the first input is received; the second period is a period from a first moment to a fourth moment; the first moment is a moment when a last message update is performed in the target display region; and the fourth moment is a moment that is the preset duration later than the first moment.

Optionally, in this embodiment of this disclosure, the processing module 1103 may be further configured to: in a case that the message displayed in the target display region is updated within a third period, display the second detail page corresponding to the after-update message in response to the first input. The third period is a period from the first moment to the third moment; the first moment is the moment when the last message update is performed in the target display region; and the third moment is a moment that is the preset duration earlier than the moment when the first input is received.

Optionally, in this embodiment of this disclosure, the display module 1102 may be further configured to display the second detail page and target prompt information, where the target prompt information is used to prompt the user that the first input is an accidentally triggered input. The receiving module 1101 may be further configured to receive a second input. The display module 1102 may be configured to update the second detail page to the first detail page in response to the second input.

The display apparatus for a message detail page in this embodiment of this disclosure may be a functional entity and/or a functional module that is in an electronic device and that performs the display method for a message detail page, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (ultra-mobile personal computer, UMPC), a netbook, a personal digital assistant (personal digital assistant, PDA), or the like. The non-mobile electronic device may be a server, a network attached storage (network attached storage, NAS), a personal computer (personal computer, PC), a television (television, TV), a teller machine, a self-service machine, or the like. This is not specifically limited in this embodiment of this disclosure.

The display apparatus for a message detail page in this embodiment of this disclosure may be an apparatus with an operating system. The operating system may be an Android (Android) operating system, may be an iOS operating system, or may be another possible operating system, which is not specifically limited in the embodiments of this disclosure.

The display apparatus for a message detail page provided in this embodiment of this disclosure can implement the processes implemented by the display apparatus for a message detail page in the method embodiments of FIG. 1 to FIG. 10. To avoid repetition, details are not described herein again.

The display apparatus for a message detail page in this embodiment of this disclosure is configured to: receive a first input on a target display region of the electronic device used for displaying a push message or a notification message; and in a case that the message displayed in the target display region is updated within the preset duration before the first input is received, display a first detail page corresponding to a before-update message in response to the first input, where the first detail page corresponding to the before-update message is different from a second detail page corresponding to an after-update message. According to this solution, if a user needs to view the push message or the notification message displayed in the target display region, the user may perform an input (namely, the first input) on the target display region. In this case, if the electronic device determines that content in the target display region is updated within the preset duration before the first input is received, the electronic device can determine that the user wants to view a detail page corresponding to the before-update message, that is, the electronic device can determine that an operation triggered by the user for the after-update message is an operation accidentally triggered by the user, so that the electronic device can directly display the first detail page corresponding to the before-update message for the user. In this way, the following problems can be avoided: the electronic device displays, for the user, the second detail page that corresponds to the after-update message and that is not required by the user; and after the second detail page is displayed, the user further needs to perform a series of operations to trigger the electronic device to display the first detail page. Therefore, the content-displaying intelligence level of an electronic device is increased; and usage experience of a user is improved.

Optionally, an embodiment of this disclosure further provides an electronic device 1000, including a processor 1010, a memory 1009, and a program or an instruction stored in the memory 1009 and executable on the processor 1010. When the program or the instruction is executed by the processor 1010, the processes of the foregoing embodiments of the display method for a message detail page are implemented, with the same technical effects achieved. To avoid repetition, details are not described herein again.

It should be noted that the electronic device in this embodiment of this disclosure includes the mobile electronic device and the non-mobile electronic device described above.

Figure 13:
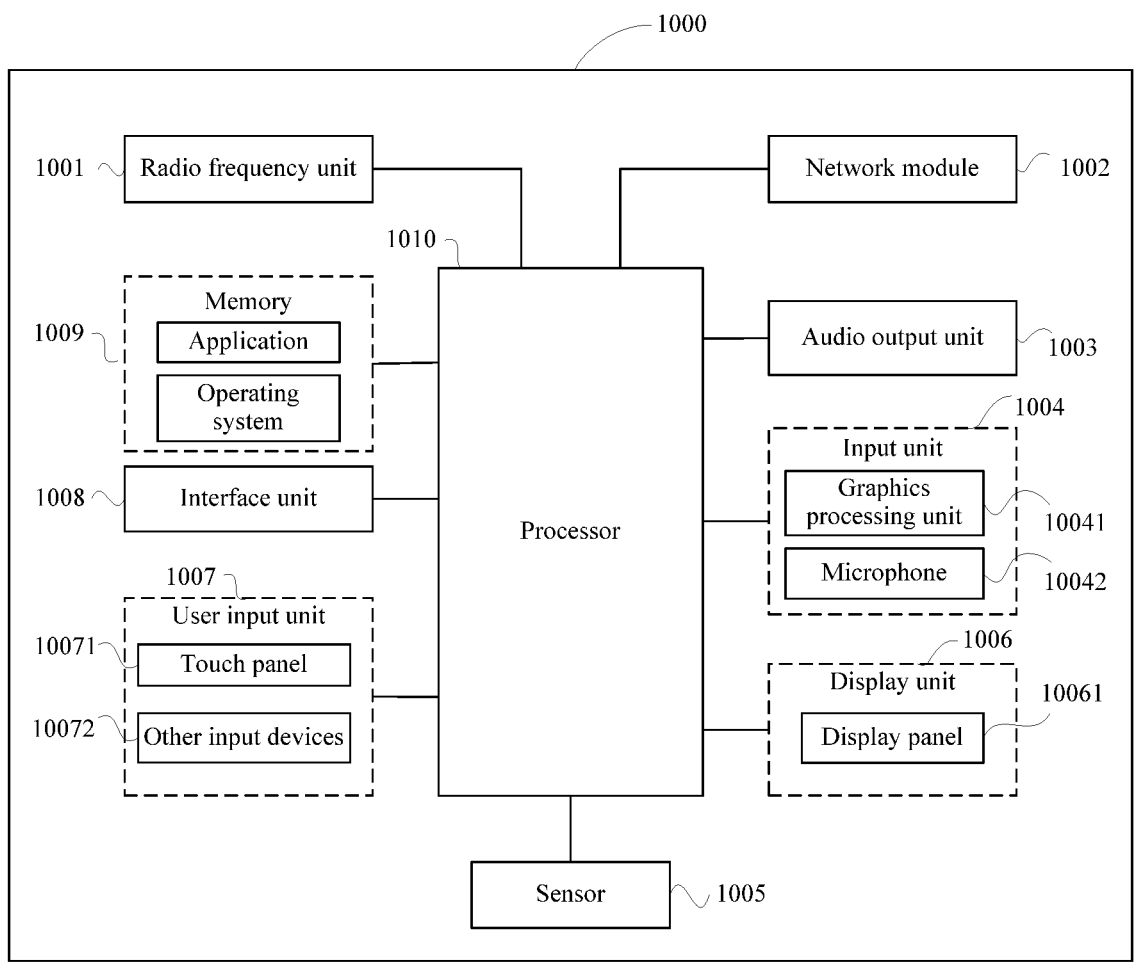
FIG. 13 is a schematic diagram of hardware of an electronic device according to an embodiment of this disclosure.

FIG. 13 is a schematic diagram of a hardware structure of an electronic device according to an embodiment of this disclosure.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

The input unit 1004 may include a graphics processing unit 10041 and a microphone 10042. The display unit 1006 may include a display panel 10061. The user input unit 1007 may include a touch panel 10071 and other input devices 10072. The memory 1009 may be configured to store a software program (for example, an operating system or an application program required by at least one function) and various data.

A person skilled in the art can understand that the electronic device 1000 may further include a power supply (for example, a battery) that supplies power to the components. The power supply may be logically connected to the processor 1010 by using a power management system, so as to implement functions such as charging management, discharging management, and power consumption management by using the power management system. The electronic device is not limited to the electronic device structure shown in FIG. 13. The electronic device may include more or fewer components than those shown in the figure, or have a combination of some components, or have a different component arrangement. Details are not described herein.

The user input unit 1007 may be configured to receive a first input on a target display region of an electronic device, where the target display region is used to display a message, and the message includes a push message or a notification message. The display unit 1006 may be configured to: in a case that the message displayed in the target display region is updated within the preset duration before the user input unit 1007 receives the first input, display a first detail page corresponding to a before-update message in response to the first input. The first detail page corresponding to the before-update message is different from a second detail page corresponding to an after-update message.

The electronic device in this embodiment of this disclosure is configured to: receive a first input on a target display region of the electronic device used for displaying a push message or a notification message; and in a case that the message displayed in the target display region is updated within the preset duration before the first input is received, display a first detail page corresponding to a before-update message in response to the first input, where the first detail page corresponding to the before-update message is different from a second detail page corresponding to an after-update message. According to this solution, if a user needs to view the push message or the notification message displayed in the target display region, the user may perform an input (namely, the first input) on the target display region. In this case, if the electronic device determines that content in the target display region is updated within the preset duration before the first input is received, the electronic device can determine that the user wants to view a detail page corresponding to the before-update message, that is, the electronic device can determine that an operation triggered by the user for the after-update message is an operation accidentally triggered by the user, so that the electronic device can directly display the first detail page corresponding to the before-update message for the user. In this way, the following problems can be avoided: the electronic device displays, for the user, the second detail page that corresponds to the after-update message and that is not required by the user; and after the second detail page is displayed, the user further needs to perform a series of operations to trigger the electronic device to display the first detail page. Therefore, the content-displaying intelligence level of an electronic device is increased; and usage experience of a user is improved.

Optionally, in this embodiment of this disclosure, the electronic device 1000 further includes a processor 1010. The processor 1010 may be configured to: in a case that a first moment is in a first period, determine that the message displayed in the target display region is updated within the preset duration before the first input is received. The first moment is a moment when a last message update is performed in the target display region; the first period is a period from a second moment to a third moment; the second moment is a moment when the first input is received; and the third moment is a moment that is the preset duration before the second moment.

It may be understood that in this embodiment of this disclosure, the electronic device can detect whether the moment when the last message update is performed in the target display region is within a period between the moment when the first input is received and the moment that is the preset duration earlier than the moment when the first input is received. When the moment is in the period, the electronic device can determine that the message displayed in the target display region of the electronic device is updated within the preset duration before the first input is received. When the moment is not in the period, the message displayed in the target display region of the electronic device is not updated. In this way, the electronic device can determine whether the message displayed in the target display region of the electronic device is updated within the preset duration before the first input is received, so that a detail page required by the user can be displayed more accurately, thereby improving the content-displaying intelligence level of the electronic device.

Optionally, in this embodiment of this disclosure, the processor 1010 may be further configured to: in a case that a second moment is in a second period, determine that the message displayed in the target display region is updated within the preset duration before the first input is received. The second moment is a moment when the first input is received; the second period is a period from a first moment to a fourth moment; the first moment is a moment when a last message update is performed in the target display region; and the fourth moment is a moment that is the preset duration later than the first moment.

It may be understood that in this embodiment of this disclosure, the electronic device can detect whether the moment when the first input is received is within a period between the moment when the last message update is performed in the target display region and the moment that is the preset duration later than the moment when the last message update is performed. When the moment is in the period, the electronic device can determine that the message displayed in the target display region of the electronic device is updated within the preset duration before the first input is received. When the moment is not in the period, the message displayed in the target display region of the electronic device is not updated. In this way, the electronic device can determine whether the message displayed in the target display region of the electronic device is updated within the preset duration before the first input is received, so that a detail page required by the user can be displayed more accurately, thereby improving the content-displaying intelligence level of the electronic device.

Optionally, in this embodiment of this disclosure, the processor 1010 may be further configured to: in a case that the message displayed in the target display region is updated within a third period, display the second detail page corresponding to the after-update message in response to the first input. The third period is a period from the first moment to the third moment; the first moment is the moment when the last message update is performed in the target display region; and the third moment is a moment that is the preset duration earlier than the moment when the first input is received.

It may be understood that in this embodiment of this disclosure, the electronic device may be further configured to: detect whether the message displayed in the target display region is updated within a third period; and in a case that the message displayed in the target display region is updated within the third period, display the second detail page corresponding to the after-update message. In this way, a detail page required by the user can be displayed more accurately, thereby improving the content-displaying intelligence level of the electronic device.

Optionally, in this embodiment of this disclosure, the display unit 1006 may be further configured to display the second detail page and target prompt information, where the target prompt information is used to prompt the user that the first input is an accidentally triggered input. The user input unit 1007 may be further configured to receive a second input. The display unit 1006 may be configured to update the second detail page to the first detail page in response to the second input.

It may be understood that in this embodiment of this disclosure, in a case that the electronic device displays the second detail page and the target prompt information, the user can trigger, via the second input, the electronic device to update the displayed second detail page to the first detail page. In this way, the following problem can be avoided: after the second detail page is displayed, the electronic device can be triggered to display the first detail page corresponding to the before-update message only when the user further returns to a previous message display screen and performs an input on the before-update message again in the screen. Therefore, the content-displaying intelligence level of an electronic device is increased, thereby further improving usage experience of a user.

An embodiment of this disclosure further provides a non-transitory readable storage medium, where the non-transitory readable storage medium stores a program or an instruction, and when the program or the instruction is executed by a processor, the processes of the foregoing embodiments of the display method for a message detail page are implemented, with the same technical effects achieved. To avoid repetition, details are not described herein again.

The processor is a processor in the electronic device in the foregoing embodiments. The non-transitory readable storage medium includes a non-transitory computer-readable storage medium such as a computer read-only memory (ROM), a random access memory (RAM), a magnetic disk, or an optical disc.

An embodiment of this disclosure further provides a chip. The chip includes a processor and a communications interface. The communications interface is coupled with the processor. The processor is configured to execute a program or an instruction to implement the processes of the foregoing embodiments of the display method for a message detail page, with the same technical effects achieved. To avoid repetition, details are not described herein again.

It should be understood that the chip mentioned in the embodiments of this disclosure may also be referred to as a system-on-chip, a system chip, a chip system, a system-on-a-chip, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of this disclosure is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this disclosure essentially, or the part contributing to the prior art may be implemented in a form of a software product. The computer software product is stored in a non-transitory storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing specific implementation manners. The foregoing specific implementation manners are merely schematic instead of restrictive. Under enlightenment of this disclosure, a person of ordinary skills in the art may make many forms without departing from aims and the protection scope of claims of this disclosure, all of which fall within the protection scope of this disclosure.

What is claimed is:

1. A display method for a message detail page, comprising:
   receiving a first input on a target display region of an electronic device, wherein the target display region is used to display a message, and the message comprises a push message or a notification message;
   determining whether the message displayed in the target display region is updated within a preset duration before the first input is received; and
   in a case that the message displayed in the target display region is updated within the preset duration before the first input is received, displaying a first detail page corresponding to a before-update message in response to the first input, wherein
   the first detail page corresponding to the before-update message is different from a second detail page corresponding to an after-update message.

2. The method according to claim 1, wherein after the receiving the first input on the target display region of the electronic device, the method further comprises:
   in a case that a first moment is in a first period, determining that the message displayed in the target display region is updated within the preset duration before the first input is received, wherein
   the first moment is a moment when a last message update is performed in the target display region; the first period is a period from a second moment to a third moment; the second moment is a moment when the first input is received; and the third moment is a moment that is the preset duration earlier than the second moment.

3. The method according to claim 1, wherein after the receiving the first input on the target display region of the electronic device, the method further comprises:
   in a case that a second moment is in a second period, determining that the message displayed in the target display region is updated within the preset duration before the first input is received, wherein
   the second moment is a moment when the first input is received; the second period is a period from a first moment to a fourth moment; the first moment is a moment when a last message update is performed in the target display region; and the fourth moment is a moment that is the preset duration later than the first moment.

4. The method according to claim 1, wherein after the receiving the first input on the target display region of the electronic device, the method further comprises:
in a case that the message displayed in the target display region is updated within a third period, displaying the second detail page corresponding to the after-update message in response to the first input, wherein
the third period is a period from a first moment to a third moment; the first moment is a moment when a last message update is performed in the target display region; and the third moment is a moment that is the preset duration earlier than the moment when the first input is received.

5. The method according to claim 1, wherein before the displaying the first detail page corresponding to the before-update message, the method further comprises:
displaying the second detail page and target prompt information, wherein the target prompt information is used to prompt a user that the first input is an accidentally triggered input; and
receiving a second input; and
the displaying the first detail page corresponding to the before-update message comprises:
updating the second detail page to the first detail page in response to the second input.

6. A computer program product, wherein the computer program product is executed by at least one processor to implement the display method for a message detail page according to claim 1.

7. A chip, comprising a processor and a communications interface, wherein the communications interface is coupled to the processor, and the processor is configured to execute a program or an instruction to implement the display method for a message detail page according to claim 1.

8. An electronic device, comprising: a processor, a memory, and a program or an instruction stored in the memory and executable on the processor, wherein the program or the instruction, when executed by the processor, causes the electronic device to perform:
receiving a first input on a target display region of the electronic device, wherein the target display region is used to display a message, and the message comprises a push message or a notification message;
determining whether the message displayed in the target display region is updated within a preset duration before the first input is received; and
in a case that the message displayed in the target display region is updated within the preset duration before the first input is received, displaying a first detail page corresponding to a before-update message in response to the first input, wherein
the first detail page corresponding to the before-update message is different from a second detail page corresponding to an after-update message.

9. The electronic device according to claim 8, wherein the program or the instruction, when executed by the processor, causes the electronic device to further perform:
in a case that a first moment is in a first period, determining that the message displayed in the target display region is updated within the preset duration before the first input is received, wherein the first moment is a moment when a last message update is performed in the target display region; the first period is a period from a second moment to a third moment; the second moment is a moment when the first input is received; and the third moment is a moment that is the preset duration earlier than the second moment.

10. The electronic device according to claim 8, wherein the program or the instruction, when executed by the processor, causes the electronic device to further perform:
in a case that a second moment is in a second period, determining that the message displayed in the target display region is updated within the preset duration before the first input is received, wherein
the second moment is a moment when the first input is received; the second period is a period from a first moment to a fourth moment; the first moment is a moment when a last message update is performed in the target display region; and the fourth moment is a moment that is the preset duration later than the first moment.

11. The electronic device according to claim 8, wherein the program or the instruction, when executed by the processor, causes the electronic device to further perform:
in a case that the message displayed in the target display region is updated within a third period, displaying the second detail page corresponding to the after-update message in response to the first input, wherein
the third period is a period from a first moment to a third moment; the first moment is a moment when a last message update is performed in the target display region; and the third moment is a moment that is the preset duration earlier than the moment when the first input is received.

12. The electronic device according to claim 8, wherein the program or the instruction, when executed by the processor, causes the electronic device to further perform:
displaying the second detail page and target prompt information, wherein the target prompt information is used to prompt a user that the first input is an accidentally triggered input; and
receiving a second input; and
the program or the instruction, when executed by the processor, causes the electronic device to perform:
updating the second detail page to the first detail page in response to the second input.

13. A non-transitory readable storage medium, wherein the non-transitory readable storage medium stores a program or an instruction, and the program or the instruction, when executed by a processor of an electronic device, causes the electronic device to perform:
receiving a first input on a target display region of the electronic device, wherein the target display region is used to display a message, and the message comprises a push message or a notification message;
determining whether the message displayed in the target display region is updated within a preset duration before the first input is received; and
in a case that the message displayed in the target display region is updated within the preset duration before the first input is received, displaying a first detail page corresponding to a before-update message in response to the first input, wherein
the first detail page corresponding to the before-update message is different from a second detail page corresponding to an after-update message.

14. The non-transitory readable storage medium according to claim 13, wherein the program or the instruction, when executed by the processor, causes the electronic device to further perform:
    in a case that a first moment is in a first period, determining that the message displayed in the target display region is updated within the preset duration before the first input is received, wherein
    the first moment is a moment when a last message update is performed in the target display region; the first period is a period from a second moment to a third moment; the second moment is a moment when the first input is received; and the third moment is a moment that is the preset duration earlier than the second moment.

15. The non-transitory readable storage medium according to claim 13, wherein the program or the instruction, when executed by the processor, causes the electronic device to further perform:
    in a case that a second moment is in a second period, determining that the message displayed in the target display region is updated within the preset duration before the first input is received, wherein
    the second moment is a moment when the first input is received; the second period is a period from a first moment to a fourth moment; the first moment is a moment when a last message update is performed in the target display region; and the fourth moment is a moment that is the preset duration later than the first moment.

16. The non-transitory readable storage medium according to claim 13, wherein the program or the instruction, when executed by the processor, causes the electronic device to further perform:
    in a case that the message displayed in the target display region is updated within a third period, displaying the second detail page corresponding to the after-update message in response to the first input, wherein
    the third period is a period from a first moment to a third moment; the first moment is a moment when a last message update is performed in the target display region; and the third moment is a moment that is the preset duration earlier than the moment when the first input is received.

17. The non-transitory readable storage medium according to claim 13, wherein the program or the instruction, when executed by the processor, causes the electronic device to further perform:
    displaying the second detail page and target prompt information, wherein the target prompt information is used to prompt a user that the first input is an accidentally triggered input; and
    receiving a second input; and
    the program or the instruction, when executed by the processor, causes the electronic device to perform:
        updating the second detail page to the first detail page in response to the second input.

\* \* \* \* \*